March 1, 1960     I. A. TAYLOR     2,926,868
AIRCRAFT WITH TILTABLE JETS
Filed Aug. 7, 1956     3 Sheets-Sheet 1
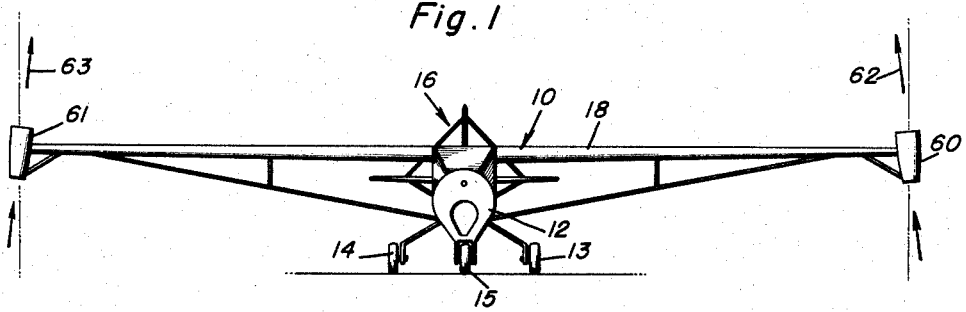
Fig. 1
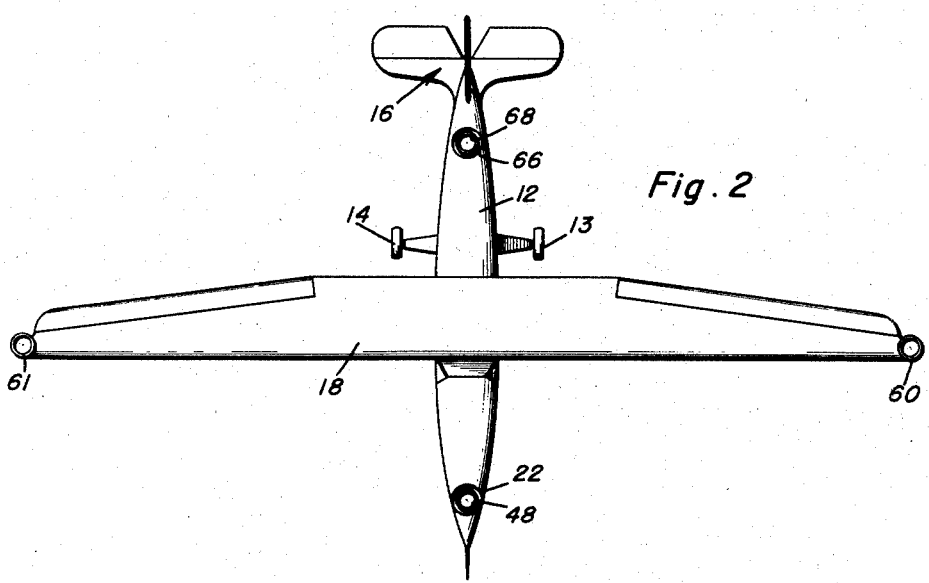
Fig. 2
Fig. 3
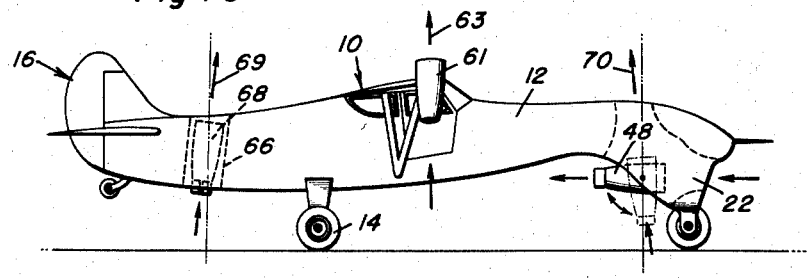
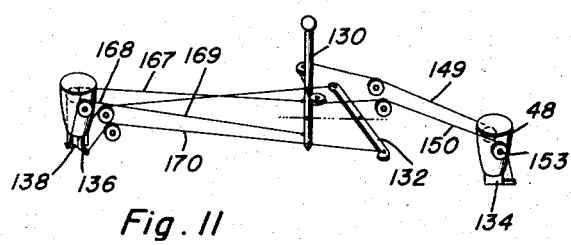
Fig. 11
Isadore A. Taylor
INVENTOR.

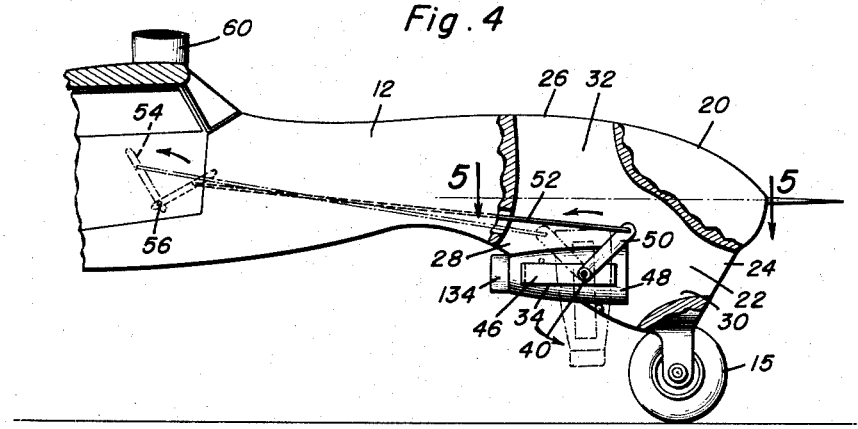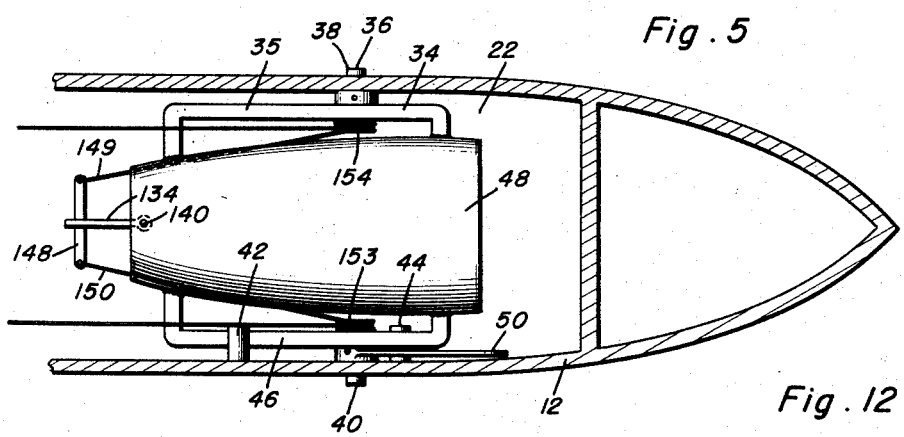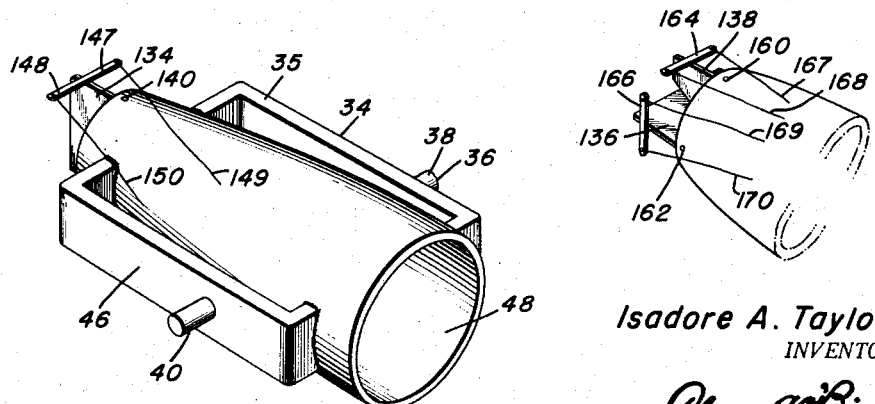

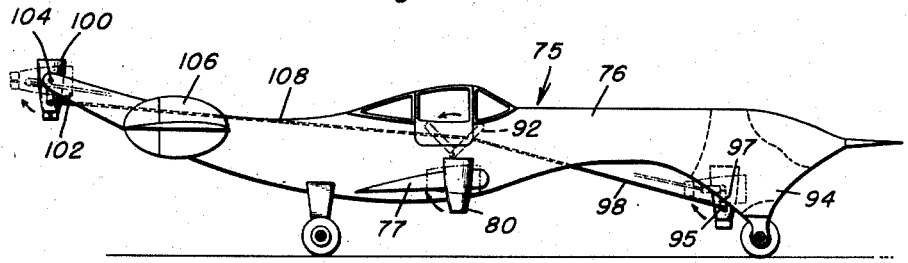
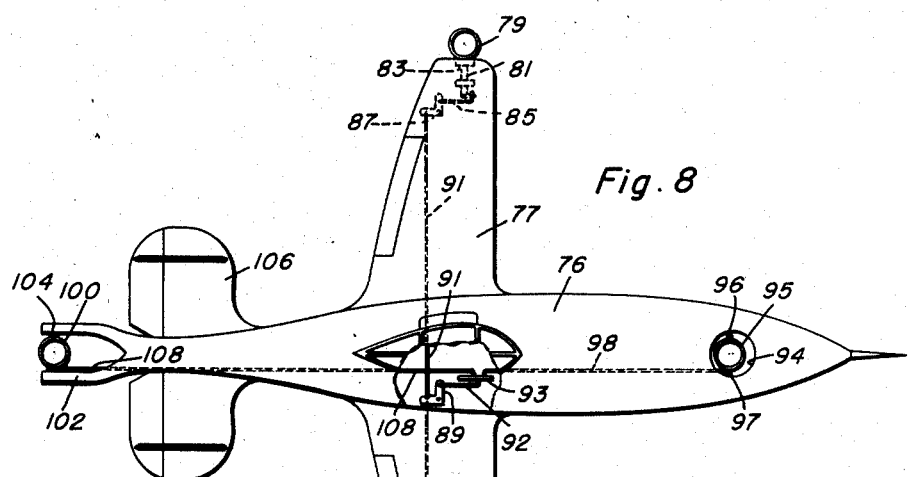
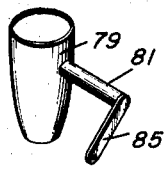
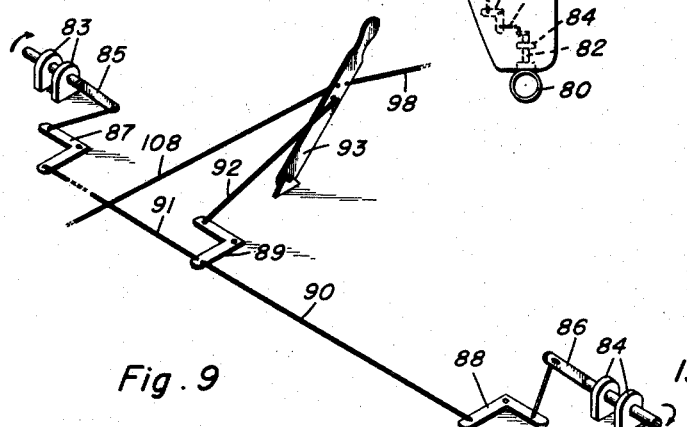
Isadore A. Taylor
INVENTOR.

United States Patent Office 2,926,868
Patented Mar. 1, 1960

2,926,868

AIRCRAFT WITH TILTABLE JETS

Isadore A. Taylor, Davisburg, Mich.

Application August 7, 1956, Serial No. 602,620

5 Claims. (Cl. 244—12)

This invention relates to improvements in aircraft and more particularly to improvements in the propulsion systems for aircraft.

An object of the present invention is to provide a simple and efficient means of propelling an aircraft, regardless of its configuration, the propulsion system being specifically designed to aid in lifting the aircraft from the ground and for sustaining the flight thereof.

A further object of the invention is to provide an aircraft with ordinary controls, that is, ailerons, stabilizer, elevator, etc., and ordinary controls that become operative when the aircraft is hovering. More explicitly, it is an object of the invention to provide tabs on controllable engines, the tabs being in the engine blast whence they derive control forces, these tabs being effective when the aircraft is in a hovering condition, and the standard controls being ineffective (ailerons, stabilizer, etc.) inasmuch as there is no, or substantially no forward flight or relative motion of air with respect to the aircraft.

Another object of the invention is to provide a propulsion system for an aircraft wherein there are one or more auxiliary or main jet engines having their lines or thrust arranged in a generally upright position to provide forward motion and/or control thrust.

A more specific object of the invention is to provide a propulsion system for an aircraft, using such an arrangement of engines wherein the engines are located in the fore and aft parts of the aircraft fuselage or body and on the wing tips, the engines being adjustable in order to alter the line of thrust of the engines for changing the aircraft attitude in accordance with the desires of the pilot.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front view of one form of the invention;

Figure 2 is a top plan view of the airplane in Figure 1, which exemplifies one form of the invention;

Figure 3 is a side elevational view of the aircraft of Figure 1;

Figure 4 is an enlarged fragmentary view, part shown in section and part shown in elevation, of the nose part of the fuselage of Figure 1;

Figure 5 is an enlarged sectional view taken on a line 5—5 of Figure 4;

Figure 6 is a perspective view of one of the jet engines and its support cradle, constituting a major part of the invention;

Figure 7 is a side elevational view of a modification of the invention;

Figure 8 is a plan view of the modification of Figure 7 illustrating particularly the control system for the four jet engines of the aircraft;

Figure 9 is a fragmentary perspective view showing schematically the single stick control for the four engines of Figure 8;

Figure 10 is a perspective view of one of the engines on the wing tips of Figure 8;

Figure 11 is a schematic perspective view of the tab control system that is superimposed on the ordinary controls of the aircraft; and Figure 12 is a fragmentary perspective view of one of the engines showing the means for adjusting the tabs.

Referring to the accompanying drawings wherein the principles of the invention are embodied in an aircraft, it is observed that although a more or less conventional appearing aircraft is shown in the drawings, this is not a necessity. Other configurations may utilize the principles of the invention either as an assist for propulsion or as the sole or main propulsion means for the aircraft.

There is an airplane 10 in Figure 1 which has various structure apertinent to ordinary airplanes, including a fuselage 12, landing wheels 13 and 14, together with a nose wheel 15. There is an empennage 16 located at the aft end of the fuselarge and a wing 18 having ordinary controls thereon.

The nose 20 of the fuselage is altered from ordinary construction, inasmuch as it has a cavity 22 with an opening 24 at the front thereof and an opening 26 at the top thereof. The bottom 28 is also open, thereby providing an upwardly extending passage and a forwardly extending passage with the open bottom 28 functioning as a common end for the forward passage 30 and the upward passage 32. A support or cradle 34, consisting of a rectangular frame 35, is mounted for pivotal movement on a horizontal axis 36 in cavity 22. The frame has trunnions 38 and 40 passing through bearings in the fuselage and supporting the frame for pivotal movement about an axis transverse to the aircraft center line. Stop pins 42 and 44 are attached to the fuselage and protrude inwardly thereof in the path of movement of side 46 of cradle 34. This defines the limits of travel for the cradle and the jet propulsion engine 48 carried thereby.

There are means for altering the line of thrust of the engine which extend from the air inlet to the gas outlet on a longitudinal center line of the engine casing. These means comprise a crank arm 50 fixed to frame side 46 and provided with a link 52 which extends rearwardly to the control crank or stick 54 mounted for movement on pivot 56 in the cabin of the fuselage. In operation, the line of thrust is altered from the extremes shown in Figure 3; that is, with the thrust line approximately horizontal to approximately vertical or preferably slightly aft of vertical in order to enhance the stability of the aircraft in flight.

In addition to the engine 48, there are wing tip mounted engines 60 and 61 whose lines of thrust 62 and 63 are inclined inwardly and upwardly a few degrees in order to enhance the stability of the aircraft in flight in much the same way as the dihedral angle of the wing tilts the vertical components of force inwardly and upwardly. An approximately vertical cavity 66 is in the aft part of the fuselage, extending through the top and botom thereof, and jet engine 68 is located therein. The line of thrust 69 of this engine is tilted forwardly in order to intersect the line of thrust 70 of the forward engine 48 when the forward engine is in the rearmost position as shown in Figure 3. In this embodiment of the invention, only the forward engine is controllable as to position, with the remainder of the engines fixed.

Attention is now invited to Figures 7-10 inclusive, where the airplane 75 consists of a fuselage 76 having wing 77 on whose tips there are jet engines 79 and 80 respectively. Each engine is mounted on a spindle 81 and 82, the latter being supported in bearings 83 and 84 concealed in the wing tips. Cranks 85 and 86 are connected to the spindles 81 and 82, and they are pivotally secured to bell cranks 87 and 88. These bell cranks are attached to main bell crank 89 by means of links 90 and 91, and the latter is operated by a link 92 that is connected to bell crank 89 and control stick 93.

The frontal cavity 94, which is identical to cavity 22, has jet engine 95 mounted for pivotal movement therein, either directly on trunnions 96 that are carried by the fuselage or in a cradle such as that shown in Figure 6. In either case, the line of thrust of engine 95 is altered by moving crank 97, which is connected to one of the pivots of the engine, and link 98 which is secured to the control stick 93.

The aft engine 100 is mounted for pivotal movement about a horizontal axis 104 on which trunnions are located. The trunnions are supported in a yoke or cradle 102 at the aft end of the fuselage and behind empennage 106. Control link 108 is secured through the crank on one of the pivots to engine and to the control stick 93.

The angularity of the engines in this embodiment is the same as the angularity of the previously described corresponding engines of Figure 1, and the operation is the same except all of the engines are simultaneously adjustable.

Control stick 130 is illustrated in Figure 11, this control stick being representative of a standard control of an aircraft. In addition to the control stick there is a foot-operated bar 132, this bar ordinarily assuming the configuration of foot pedals. These controls, schematically represented as stick 130 and foot lever 132, are intended to portray the standard rudimentary aircraft controls, including ailerons, elevator and stabilizer. Under ordinary conditions and in an ordinary construction, the foot-operated lever 132 and control stick 130 would have cables and a system of pulleys operatively connected therewith. Superimposed thereon are control means for a group of tabs. There are three tabs in all. One tab 34 is on the forward engine of one or more of the previously described embodiments of the invention, while there are two tabs 136 and 138 at right angles to each other and located on the aft engine of one or more of the embodiments of the invention previously described herein. Tab 134 on the forward engine 48, for example, is connected on a vertical hinge 140 at the aft end of the engine and it is arranged from front to rear and has laterally projecting horns 147 and 148 to which control cables 149 and 150 are secured. These cables are entrained over pulleys 153 and 154 that are mounted on the common axis of trunnions 36 and 40 and return over a network of idler pulleys to an operative connection to the control stick 130, whereby, upon movement of the control stick from the left to the right or the right to the left, control tab 134 is hingedly actuated. The purpose is to apply control forces onto the aircraft while in hovering flight or in extremely low speed flight or in other operational conditions as will occur to the pilot.

Fins 136 and 138 are shown mounted on an engine at the aft of the fuselage, and this engine may be identical to engine 100 (Figure 7) or any corresponding engine of the other embodiments. Control tab or fin 138 is mounted on a vertical hinge 160, while tab 136 is mounted on the horizontal hinge 162, these hinges being carried by the engine and so located as to position the tabs in the issuing stream of gases. Horns 164 and 166 are attached to the fins and they have control cables 167, 168, 169 and 170 respectively attached thereto. These cables extend over a network of guide pulleys and are secured to the foot-operated lever 132 so as to obtain deflection thereof in response to movement of the foot-operated lever 132.

The front tab is controlled from the side motion of the control stick 130. Movement of the stick to the right will cause the nose of the aircraft to move to the right, while movement of the stick to the left will cause a corresponding movement of the aircraft. This is only true when the aircraft is hovering or traveling at a very low speed. When the ship is hovering, the standard controls (ailerons, elevator, etc.) are ineffectual, because there is no moving air over the control surfaces. Therefore, by connecting the three small tabs, one in the forward engine and the other in the aft engine as previously described, and superimposing the control thereof on the regular control system of the aircraft, the aircraft is capable of switching from forward flight to hovering flight, that is, the control of the aircraft is obtained from the conventional aerodynamic control surfaces to a hovering flight principle by utilizing the issuing gases from the engines without changing the system of control nor using a different set of controls for the two different principles.

What is claimed as new is as follows:

1. In an airplane which includes a fuselage, a wing and a tail, a propulsion system for the airplane comprising an engine at the front of said fuselage, means to adjust the thrust angle of said engine, a cavity having a forward opening part and an upward opening part, said cavity being located in front of said fuselage, a support for said engine mounted for pivotal movement in said cavity so as to direct the engine in alignment with the opening parts of said cavity, engines at the tips of said wing which are arranged to produce thrust at said wing tips in a generally upward direction, an aft engine carried by the rear part of said fuselage and arranged to produce thrust generally upwardly to help lift the fuselage, means mounting said aft engine for pivotal movement, pivotal support means for each wing tip engine, and means synchronized with said thrust angle adjusting means to pivotally adjust said wing tip supported engines and said aft engine.

2. A flying machine comprising a body having a front and rear end and wings protruding from said body between its ends, a fore and aft cavity in said body defining pasages through said body, jet engines pivotally mounted in said cavities and on said wings, tab means carried by said jet engines in the stream of issuing gases therefrom, and means connected to said engines for controlling the pivotal movement of said engines whereby the line of thrust of said engines will be controlled.

3. In an airplane which includes a fuselage, a wing and a tail, a propulsion system for the airplane comprising an engine at the front of said fuselage, means to adjust the thrust angle of said engine, a cavity having a forward opening part and an upward opening part, said cavity being located in front of said fuselage, a support for said engine mounted for pivotal movement in said cavity so as to direct the engine in alignment with the opening parts of said cavity, engines at the tips of said wing which are arranged to produce thrust at said wing tips in a generally upward direction, an aft engine carried by the rear part of said fuselage and arranged to produce thrust generally upwardly to help lift the fuselage, means mounting said aft engine for pivotal movement, pivotal support means for each wing tip engine, and means synchronized with said thrust angle adjusting means to pivotally adjust said wing tip supported engines and said aft engine, each of said engines being of the jet type.

4. In an airplane which includes a fuselage, a wing and a tail, a propulsion system for the airplane comprising an engine at the front of said fuselage, means to adjust the thrust angle of said engine, a cavity having a forward opening part and an upward opening part, said cavity being located in front of said fuselage, a support for said engine mounted for pivotal movement in said cavity so as to direct the engine in alignment with the opening parts of said cavity, engines at the tips of said wing which are arranged to produce thrust at said wing tips in a generally upward direction, an aft engine carried by the rear part of said fuselage and arranged to produce thrust generally upwardly to help lift the fuselage, means mounting said aft engine for pivotal movement, pivotal support means for each wing tip engine, and means synchronized with said thrust angle adjusting means to pivotally adjust said wing tip supported engines and said aft engine, each of said engines being of the jet type, tab means carried by said jet engines in the stream of issuing gases therefrom, and means connected to said tab means for controlling said tab means.

5. A flying machine comprising a body having a front and rear end and wings protruding from said body between its ends, a fore and aft cavity in said body defining passages through said body, jet engines pivotally mounted in said cavities and on said wings, tab means carried by said engines in the stream of issuing gases therefrom, and means connected to said engines for controlling the pivotal movement of said engines whereby the line of thrust of said engines will be controlled, and means connected to said tab means for controlling said tab means.

References Cited in the file of this patent

UNITED STATES PATENTS

| | | |
|---|---|---|
| 1,315,586 | Wilson | Sept. 9, 1919 |
| 1,727,786 | Richardsen | Sept. 10, 1929 |
| 1,766,390 | Lapin | June 24, 1930 |
| 1,781,371 | Delo | Nov. 11, 1930 |
| 1,783,458 | Windsor | Dec. 2, 1930 |
| 2,450,821 | Zimmerman | Oct. 5, 1948 |
| 2,501,078 | Newcomb | Mar. 21, 1950 |
| 2,677,931 | Prieto | May 11, 1954 |
| 2,738,147 | Leech | Mar. 13, 1956 |
| 2,762,584 | Price | Sept. 11, 1956 |

FOREIGN PATENTS

| | | |
|---|---|---|
| 506,664 | Belgium | May 21, 1954 |
| 975,981 | France | Oct. 17, 1950 |